United States Patent
Hsu et al.

(10) Patent No.: US 10,260,988 B2
(45) Date of Patent: Apr. 16, 2019

(54) NON-CONTACT MEASUREMENT DEVICE FOR RADIUS OF CURVATURE AND THICKNESS OF LENS AND MEASUREMENT METHOD THEREOF

(71) Applicant: NATIONAL APPLIED RESEARCH LABORATORIES, Taipei (TW)

(72) Inventors: Wei-Yao Hsu, Hsinchu (TW); Wei-Jei Peng, Hsinchu (TW); Zong-Ru Yu, Hsinchu (TW); Jung-Hsin Wang, Hsinchu (TW); Po-Jui Chen, Hsinchu (TW); Cheng-Fang Ho, Hsinchu (TW); Chi-Hung Huang, Hsinchu (TW); Chun-Cheng Chen, Hsinchu (TW); Hua-Lin Chen, Hsinchu (TW); Yi-Hao Lin, Hsinchu (TW); Ming-Fu Chen, Hsinchu (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 0 days.

(21) Appl. No.: 16/007,439

(22) Filed: Jun. 13, 2018

(65) Prior Publication Data
US 2018/0356311 A1 Dec. 13, 2018

(30) Foreign Application Priority Data
Jun. 13, 2017 (TW) .............................. 106119593 A (51) Int. Cl.
*G01B 9/00* (2006.01)
*G01M 11/02* (2006.01)

(52) U.S. Cl.
CPC .... *G01M 11/0242* (2013.01); *G01M 11/0207* (2013.01)

(58) Field of Classification Search
CPC .. G01B 9/00; G01M 11/0242; G01M 11/0207
See application file for complete search history.

(56) References Cited

U.S. PATENT DOCUMENTS

| 6,791,696 | B1 * | 9/2004 | Fantone ................. G01B 11/00 356/601 |
| 9,019,485 | B2 * | 4/2015 | Ignatovich ......... G01M 11/0235 356/73 |
| 2002/0085196 | A1 * | 7/2002 | Fukuma ............. G01M 11/0207 356/124 |

* cited by examiner

*Primary Examiner* — Roy M Punnoose
(74) *Attorney, Agent, or Firm* — Muncy, Geissler, Olds & Lowe, P.C.

(57) ABSTRACT

The present disclosure illustrates a non-contact measurement device for a radius of curvature and a thickness of a lens and a measurement method thereof. The non-contact measurement device utilizes a non-contact probe to integrate a motor, an optical scale and an electronic control module, so as to achieve measurement for the radius of curvature and the thickness of the lens. The present disclosure adopts astigmatism to achieve fast and precise focusing. To overcome the spherical aberration problem, thickness measurement can be implemented by the non-contact measurement device through a formula calculation and utilization of a correction plate, wherein single one probe is used for the measurement herein. For the thicker lens, the non-contact measurement device can be extended to use dual probes, so as to detect the top and bottom sides of the lens.

14 Claims, 10 Drawing Sheets

```
┌─────────────────────────────────────────┐
│ emitting a first measurement beam on a top │
│ surface or a bottom surface of the lens under │──S101
│ test from a first non-contact probe assembly │
└─────────────────────────────────────────┘
                    ↓
┌─────────────────────────────────────────┐
│ determining whether the first measurement │
│ beam is focused on the top surface or the bottom │
│ surface by using the quadrant measurement │──S102
│ device of the first non-contact probe assembly │
└─────────────────────────────────────────┘
                    ↓
┌─────────────────────────────────────────┐
│ moving the first non-contact probe assembly by │
│ using a motor of an actuation assembly to make │──S103
│ the first measurement beam focused on the top │
│ surface or the bottom surface │
└─────────────────────────────────────────┘
                    ↓
┌─────────────────────────────────────────┐
│ calculating a displacement of the first non- │
│ contact probe assembly by using an optical │──S104
│ scale of the actuation assembly │
└─────────────────────────────────────────┘
                    ↓
┌─────────────────────────────────────────┐
│ controlling the actuation assembly to move the │
│ first non-contact probe assembly to make the │
│ first measurement beam focused on the top │
│ surface by using a control and calculation │──S105
│ assembly , and calculating a radius of curvature │
│ data of the lens under test │
└─────────────────────────────────────────┘
                    ↓
┌─────────────────────────────────────────┐
│ calculating a thickness data of the lens under │
│ test by using the control and calculation │──S106
│ assembly │
└─────────────────────────────────────────┘
```

```
┌─────────────────────────────────────────────┐
│ emitting a first and second measurement beams on a │
│ top surface and bottom surfaces of the lens under test │──── S201
│ from the first non-contact probe assembly and the │
│ second non-contact probe assembly │
└─────────────────────────────────────────────┘
                        ↓
┌─────────────────────────────────────────────┐
│ determining whether the first and second measurement │
│ beams are focused on the top and bottom surfaces by │
│ using the quadrant measurement devices of the first │──── S202
│ and the second non-contact probe assemblies │
└─────────────────────────────────────────────┘
                        ↓
┌─────────────────────────────────────────────┐
│ moving the first and second non-contact probe │
│ assemblies by using a motor of the actuation assembly │──── S203
│ to make the first and second measurement beams │
│ focused on the top and bottom surfaces │
└─────────────────────────────────────────────┘
                        ↓
┌─────────────────────────────────────────────┐
│ calculating the first and second displacements of the │──── S204
│ first and second non-contact probe assemblies by │
│ using an optical scale of the actuation assembly │
└─────────────────────────────────────────────┘
                        ↓
┌─────────────────────────────────────────────┐
│ controlling the actuation assembly to move the first │
│ and second non-contact probe assemblies to make the │
│ first and second measurement beams focused on the │
│ top and bottom surfaces by using a control and │──── S205
│ calculation device, and calculating a top surface │
│ radius of curvature data and a bottom surface radius │
│ of curvature data of the lens under test │
└─────────────────────────────────────────────┘
                        ↓
┌─────────────────────────────────────────────┐
│ calculating the thickness data of the lens under test by │──── S206
│ using the control and calculation device │
└─────────────────────────────────────────────┘
```

FIG. 12

NON-CONTACT MEASUREMENT DEVICE FOR RADIUS OF CURVATURE AND THICKNESS OF LENS AND MEASUREMENT METHOD THEREOF

CROSS-REFERENCE TO RELATED APPLICATION

This application claims priority from Taiwan Application No. 106119593, filed on Jun. 13, 2017, in the Taiwan Intellectual Property Office, the content of which is hereby incorporated by reference in their entirety for all purposes.

BACKGROUND OF THE INVENTION

1. Field of the Invention

The present disclosure relates to a non-contact measurement device for a radius of curvature and a thickness of a lens and a measurement method thereof, in particular, to a measurement device and method for detecting the radius of curvature and the thickness of a lens by using a single probe or dual probes.

2. Description of the Related Art

The present invention describes a radius meter for measuring the radius of curvature of a lens and a three dimensional metering instrument for detecting a thickness of the lens used the contact manner. In the case that high surface quality of the lens is required or the lens is too soft, a non-contact manner should be used to prevent the lens from being scraped.

Specifically, the measurement manner for the radius of curvature of spherical lens in the optical industry can be categorized into two kinds, wherein one measures by using an interferometer while another one measures by using a spherical radius meter. The interferometer measures in a non-contact manner, but the establishment cost of the system of the interferometer and the transmission sphere lenses is extremely high, and the measuring range of the radius of curvature is limited since the maximum measurable radius of curvature is limited by the optical scale and the F-number of the transmission sphere lenses. The spherical radius meter calculates the radius of curvature according to the sag or height of the lens, and its measuring range is very wide. However, the spherical radius meter has disadvantages such as, requiring use of a contact probe for measurement, and when high surface quality of the lens is required or the lens is made of soft material, the effective clear aperture of the lens may be scraped or scratched, thus causing the lens necessary rework or possibly rendering the lens unusable.

Regarding the thickness measurement of the lens, the optical industry usually uses the height meter or the three dimensional metering instrument and both of them measure in the contact manner which causes the scraping problem. In the aspect of the non-contact measurement product, most of them are usually suitable for the thickness measurement of the transparent plate, and the current market has a lack of instruments for measuring the center thickness of the lens with a radius of curvature in the non-contact manner. Furthermore, the market instruments cannot have the functions for detecting both of the radius of curvature and the thickness of the lens, and thus while the functions are integrated in one instrument, the cost can be reduced.

Thus, it is clear there is a need for such a measurement device and method for solving the above prior art problems.

SUMMARY OF THE INVENTION

To solve at least one of the above technical problems, one objective of the present disclosure is to provide a non-contact measurement device for a radius of curvature and a thickness of a lens, comprising a first non-contact probe assembly, an actuation assembly and a control and calculation assembly. The first non-contact probe assembly comprises: a light source, emitting a light beam; a reflection mirror, reflecting the light beam to change the propagation direction of the light beam; a splitting mirror, allowing a first polarized beam of the light beam to pass through the splitting mirror, and reflecting to change the direction of a second polarized beam of the light beam propagation polarized; a quarter wavelength plate, changing a polarized state of the second polarized beam after the second polarized beam passes though the quarter wavelength plate; a focusing lens, focusing the second polarized beam on a top surface or a bottom surface of the lens under test, and the second polarized beam is reflected from the lens under test and then sequentially passes through the focusing lens, the quarter wavelength plate and the splitting mirror, wherein after the second polarized beam passes through the quarter wavelength plate again, the polarized state of the second polarized beam is changed again, and then the second polarized beam passes through the splitting mirror; an astigmatism lens, allowing the second polarized beam to pass through the astigmatism lens to deliver an astigmatism beam; and a quadrant measurement device, sensing intensities of the astigmatism beam in four quadrants, so as to determine whether the second polarized beam is focused on the top surface or the bottom surface. The actuation assembly includes a motor and an optical scale. The motor is used to control the first non-contact probe assembly to move a first displacement to make the second polarized beam focused on the top surface firstly, and then control the first non-contact probe assembly move a second displacement to make the second polarized beam focused on the bottom surface, and the optical scale is used to measure the first displacement and the second displacement of the first non-contact probe assembly. The control and calculation assembly controls the actuation assembly to move the first non-contact probe assembly, calculates a radius of curvature data of the lens under test according to the first displacement when the second polarized beam is focused on the top surface, and further calculates a thickness data of the lens under test according to the radius of curvature data, the second displacement and a plurality of parameters when the second polarized beam is focused on the bottom surface.

Preferably, the control and calculation assembly calculates a sag or height data according to the first displacement, and then calculates the radius of curvature data according to the sag or height data.

Preferably, the parameters comprise an incident radial height of the second polarized beam and a cone parameter and a refractive index of the lens under test.

Preferably, the non-contact measurement device for a radius of curvature and a thickness of a lens further comprises a lens bearing ring disposed on an emission place of the first non-contact probe assembly to receive the lens under test.

According to at least one object of the present disclosure, the present disclosure provides a method for detecting a defocusing amount of an object under test using the non-contact measurement device for a radius of curvature and a thickness of a lens, comprising: emitting the second polarized beam on a surface of the object under test from the non-contact measurement device; acquiring a focus error signal by using the quadrant measurement device; and calculating the defocusing amount by using the control and calculation device according to the focus error signal and a focusing distance of the focusing lens.

According to at least one object of the present disclosure, the present disclosure provides a non-contact measurement device for a radius of curvature and a thickness of a lens, comprising a first non-contact probe assembly and a second non-contact probe assembly, an actuation assembly, a control and calculation assembly and a lens bearing ring. The first non-contact probe assembly and a second non-contact probe assembly are respectively disposed above and underneath the lens under test, and each of them comprises: a light source, emitting a light beam; a reflection mirror, reflecting the light beam to change a propagation direction of the light beam; a splitting mirror, allowing a first polarized beam of the light beam to pass through the splitting mirror, and reflecting a second polarized beam of the light beam to change a propagation direction of the second polarized beam; a quarter wavelength plate, changing a polarized state of the second polarized beam after the second polarized beam passes though the quarter wavelength plate; a focusing lens, focusing the second polarized beam on a top surface or a bottom surface of the lens under test, and the second polarized beam is reflected from the lens under test and then sequentially passes through the focusing lens, the quarter wavelength plate and the splitting mirror, wherein after the second polarized beam passes through the quarter wavelength plate again, the polarized state of the second polarized beam is changed again, and then the second polarized beam passes through the splitting mirror; an astigmatism lens, allowing the second polarized beam to pass through the astigmatism lens to deliver an astigmatism beam; and a quadrant measurement device, sensing intensities of the astigmatism beam in four quadrants, so as to determine whether the second polarized beam is focused on the top surface or the bottom surface. The actuation assembly includes a motor and an optical scale. The motor is used to control the first non-contact probe assembly to move a first displacement and the second non-contact probe assembly to move a second displacement, so as to make the second polarized beams focused on the top surface and the bottom surface of the lens under test, and the optical scale is used to measure the first displacement of the first non-contact probe assembly and the second displacement of the second non-contact probe assembly. The control and calculation assembly controls the actuation assembly to move the first non-contact probe assembly and the second non-contact probe assembly, calculates a top surface radius of curvature data and a bottom surface radius of curvature data of the lens under test according to the first displacement of the first non-contact probe assembly and the second displacement of the second non-contact probe assembly, and further calculates a thickness data of the lens under test according to the top surface radius of curvature data and the bottom surface radius of curvature data. The lens bearing ring is disposed between the first non-contact probe assembly and the second non-contact probe assembly to receive the lens under test.

According to at least one object of the present disclosure, the present disclosure provides a non-contact measurement method for a radius of curvature and a thickness of a lens, comprising: emitting a first measurement beam on a top surface or a bottom surface of the lens under test from a first non-contact probe assembly; determining whether first measurement beam is focused on the top surface or the bottom surface by using a quadrant measurement device of the first non-contact probe assembly; moving the first non-contact probe assembly by using a motor of an actuation assembly to make the first measurement beam focused on the top surface or the bottom surface; calculating a first displacement of the first non-contact probe assembly by using an optical scale of the actuation assembly; controlling the actuation assembly to move the first non-contact probe assembly the first displacement to make the first measurement beam focused on the top surface by using a control and calculation assembly, and calculating a radius of curvature data of the lens under test according to the first displacement; and controlling the actuation assembly to move the first non-contact probe assembly a second displacement to make the first measurement beam focused on the bottom surface by using the control and calculation assembly, and calculating a thickness data of the lens under test according to the second displacement and the radius of curvature data.

Preferably, the non-contact measurement method for the radius of curvature and the thickness of the lens further comprises measuring a calibration plate to obtain a reference base line for detecting the lens under test.

Preferably, the non-contact measurement method for the radius of curvature and the thickness of the lens further comprises disposing a correction plate before detecting the lens under test, and making the first measurement beam focused on a bottom surface of the correction plate.

Preferably, the non-contact measurement method for the radius of curvature and the thickness of the lens further comprises disposing a second non-contact probe assembly to emit a second measurement beam, wherein the first measurement beam is illuminated on the top surface while the second measurement beam is illuminated on the bottom surface; determining whether the second measurement beam is focused on the bottom surface by using a quadrant measurement device of the second non-contact probe assembly; and controlling the second non-contact probe assembly to move a third displacement by using the control and calculation assembly.

Preferably, the non-contact measurement method for the radius of curvature and the thickness of the lens further comprises calculating a bottom surface radius data of the lens under test according to the second displacement by using the control and calculation assembly, and calculating the thickness data of the lens under test according to the radius data and the bottom surface radius data.

According to at least one object of the present disclosure, the present disclosure provides a non-contact measurement device for a radius of curvature and thickness of a lens, comprising a first non-contact probe assembly, an actuation assembly and a control and calculation assembly. The first non-contact probe assembly comprises: a light source, emitting a light beam; a splitting mirror, allowing a first polarized beam of the light beam to pass through the splitting mirror, and reflecting a second polarized beam of the light beam to change a propagation direction of the second polarized beam; a quarter wavelength plate, changing a polarized state of the first polarized beam after the first polarized beam passes though the quarter wavelength plate; a reflection mirror; a focusing lens, focusing the first polarized beam on a top surface or a bottom surface of the lens under test, the first polarized beam is reflected from the lens under test and then sequentially passes through the focusing lens, the quarter wavelength plate, and then is reflected by the splitting mirror to change its propagation direction, and then the first polarized beam is reflected by the reflection mirror to change its propagation direction, wherein after the first polarized beam passes through the quarter wavelength plate again, the polarized state of the first polarized beam is changed again; an astigmatism lens, allowing the first polarized beam to pass through the astigmatism lens to deliver an astigmatism beam; and a quadrant measurement device, sensing intensities of the astigmatism beam in four quadrants, so as to determine whether the first polarized beam is focused on the top surface or the bottom surface. The actuation assembly includes a motor and an optical scale. The motor is used to control the first non-contact probe assembly to move a first displacement to make the first polarized beam focused on the top surface firstly, and then control the first non-contact probe assembly move a second displacement to make the first polarized beam focused on the bottom surface, and the optical scale is used to measure the first displacement and the second displacement of the first non-contact probe assembly. The a control and calculation assembly controls the actuation assembly to move the first non-contact probe assembly, calculates a radius of curvature data of the lens under test according to the first displacement when the first polarized beam is focused on the top surface, and further calculates the thickness data of the lens under test according to the radius of curvature data, the second displacement and a plurality of parameters when the first polarized beam is focused on the bottom surface.

Preferably, the control and calculation assembly calculates a sag or height data according to the first displacement, and then calculates the radius of curvature data according to the sag or height data.

Preferably, the parameters comprise an incident radial height of the first polarized beam and a cone parameter and a refractive index of the lens under test.

Preferably, the non-contact measurement device for the radius of curvature and the thickness of the lens further comprises a lens bearing ring disposed on an emission place of the first non-contact probe assembly to receive the lens under test.

According to at least one object of the present disclosure, the present disclosure provides a method for detecting a defocusing amount of an object under test using the non-contact measurement device for a radius of curvature and a thickness of a lens, comprising: emitting the first polarized beam on a surface of the object under test from the non-contact measurement device; acquiring a focus error signal by using the quadrant measurement device; and calculating the defocusing amount by using the control and calculation device according to the focus error signal and a focusing distance of the focusing lens.

DESCRIPTION OF THE EXEMPLARY EMBODIMENTS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

By referring to the following drawings, embodiments of the non-contact measurement device and method for a radius of curvature and a thickness of the lens are illustrated. It is noted that, to make the present disclosure understood easily, the same components are labeled with the same numeric label.

Figure 1:
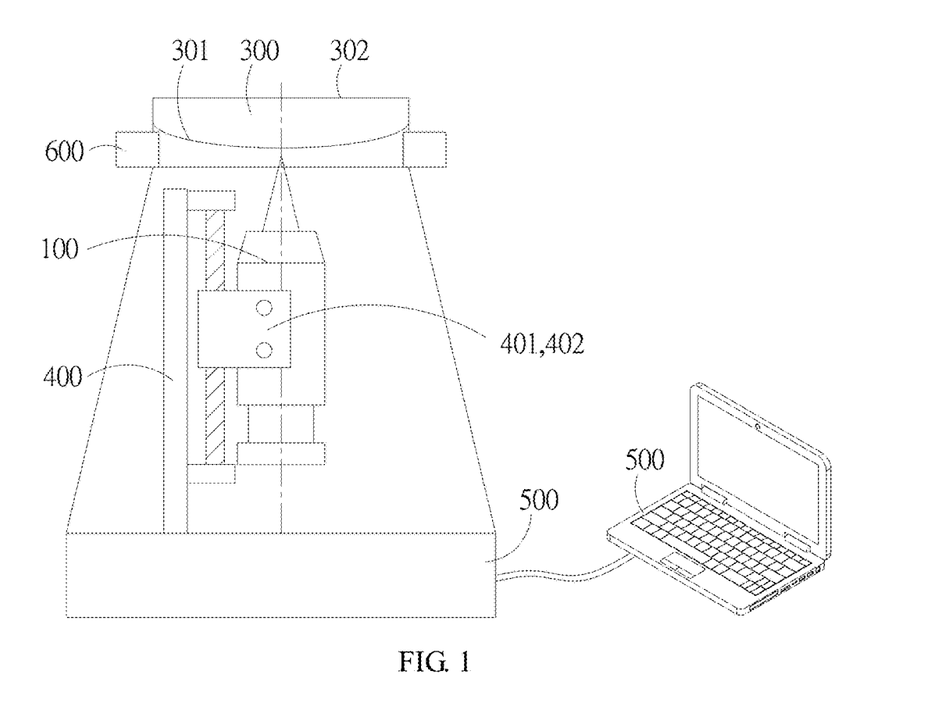
FIG. 1 is a schematic diagram showing a non-contact measurement device for a radius of curvature and a thickness of a lens according to one embodiment of the present disclosure.
Figure 2A:
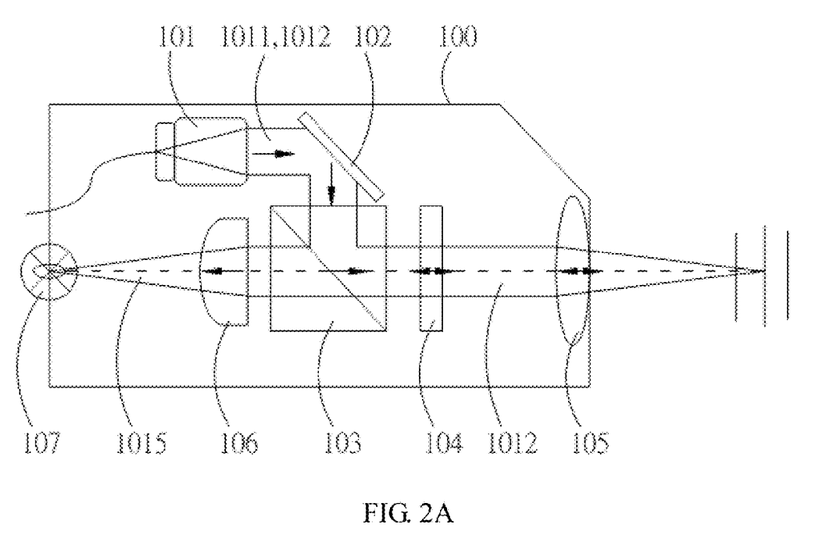
FIG. 2A is a schematic diagram showing the non-contact probe assembly according to one embodiment of the present disclosure.

Referring to FIG. 1 and FIG. 2A, FIG. 1 is a schematic diagram showing a non-contact measurement device for a radius of curvature and a thickness of a lens according to one embodiment of the present disclosure, and FIG. 2A is a schematic diagram showing the non-contact probe assembly according to one embodiment of the present disclosure.

As shown in these drawings, the non-contact measurement device for the radius of curvature and the thickness of the lens comprises a first non-contact probe assembly 100, an actuation assembly 400 and a control and calculation assembly 500, and may further comprise a lens bearing ring 600 which is disposed on an emission place of the first non-contact probe assembly 100 to receive the lens 300 under test.

As show in FIG. 2A, the first non-contact probe assembly 100 comprises a light source 101, a reflection mirror 102, a splitting mirror 103, a quarter wavelength plate 104, a focusing lens 105, an astigmatism lens 106 and a quadrant measurement device 107.

The light source 101 emits a light beam. In one embodiment, the light source 101 can emit a laser beam, and in another one embodiment, the light source 101 can emit a light beam of another kind. When the light beam of another kind is emitted, to make the light beam from the light source 101 have a uniform direction, the collimated lens can be used to adjust the light beam from the light source 101.

The reflection mirror 102 is used to reflect the light beam to change its propagation direction, and the reflected light beam passes through the splitting mirror 103. The splitting mirror 103 allows the first polarized beam 1011 of the light beam passes through the splitting mirror 103, reflects the second polarized beam 1012 of the light beam, and changes the propagation direction of the second polarized beam 1012. For example, the first polarized beam 1011 and the second polarized beam 1012 are horizontally polarized (i.e. P polarized) and vertically polarized (i.e. S polarized). Then, the second polarized beam 1012 can pass through the quarter wavelength plate 104.

The quarter wavelength plate 104 can change the polarized state of the second polarized beam 1012 after the second polarized beam passes through the quarter wavelength plate 104. For example, the linear polarized state is changed to the circular polarized state, or the circular polarized state is changed to the linear polarized state. The second polarized beam 1012 which the polarized state is changed then passes through the focusing lens 105.

The focusing lens 105 makes the second polarized beam 1012 focused on the top surface 301 or the bottom surface 302 of the lens 300 under test, and the second polarized beam 1012 reflected from the lens 300 under test can sequentially pass through the focusing lens 105, the quarter wavelength plate 104 and the splitting mirror 103. After the second polarized beam 1012 passes through the quarter wavelength plate 104, the polarized state of the second polarized beam 1012 is changed again, and then the second polarized beam 1012 passes through the splitting mirror 103, so as to prevent the reflected second polarized beam 1012 from coming back to the light source 101 to cause the interference problem, and to reduce the damage probability of the light source 101. The second polarized beam 1012 passed through the splitting mirror 103 then passes through the astigmatism lens 106.

The astigmatism lens 106 can be a semi-cylinder lens and form the astigmatism beam 1015 after the second polarized beam 1012 passes through the astigmatism lens 106. Thus, by using the astigmatism, the present disclosure can use the quadrant measurement device 107 to sense intensities of four quadrants of the astigmatism beam 1015 to determine whether the second polarized beam 1012 is focused on the top surface 301 or the bottom surface 302. For example, when the second polarized beam 1012 is precisely focused on the top surface 301 or the bottom surface 302, the quadrant measurement device 107 can sense the circular light spot; and when the second polarized beam 1012 is not precisely focused on the top surface 301 and the bottom surface 302, the quadrant measurement device 107 can sense the elliptical light spot. Thus, the control and calculation assembly 500 is used to calculate a sag or height data according to the first displacement, and then calculate a radius of curvature data of the lens under test according the sag or height data.

The actuation assembly 400 includes a motor 401 and an optical scale 402. The motor 401 controls the first non-contact probe assembly 100 to move the first displacement, and the second polarized beam 1012 is firstly focused on the top surface 301, such that the quadrant measurement device 107 senses the circular light spot.

The actuation assembly 400 can control the first non-contact probe assembly 100 to move the second displacement to make the second polarized beam 1012 focused on the bottom surface 302, and the optical scale 402 is used to measure the first and second displacements of the first non-contact probe assembly 100.

The control and calculation assembly 500 can control the actuation assembly 400 to move the first non-contact probe assembly 100, calculate the radius of curvature data of the lens 300 under test according to the first displacement when the second polarized beam 1012 is focused on the top surface 301, and calculate the thickness data of the lens 300 according to the radius of curvature data, the second displacement and a plurality of parameters when the second polarized beam 1012 is focused on the bottom surface 302. The parameters can comprise the incident radial height of the second polarized beam 1012 and the conic constant and the refractive index of the lens 300 under test.

Figure 2B:
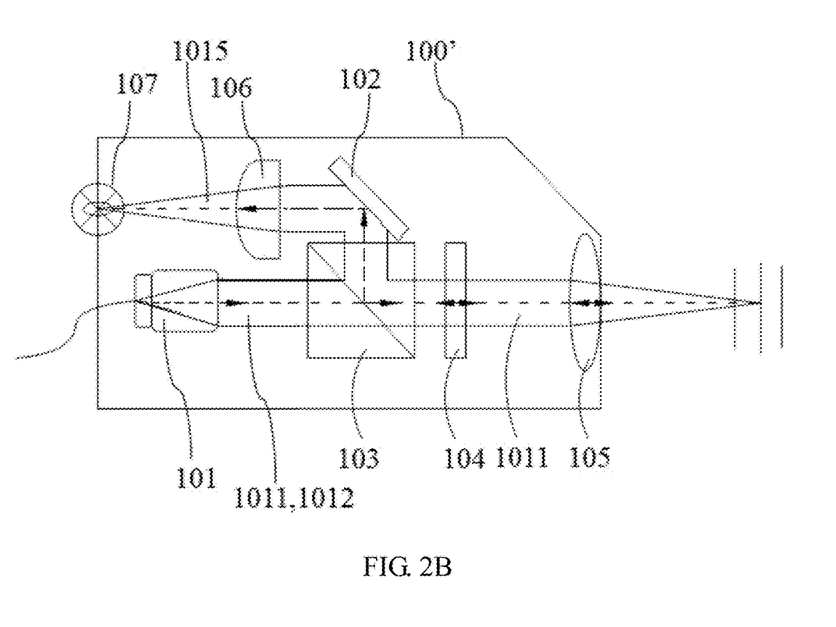
FIG. 2B is a schematic diagram showing the non-contact probe assembly according to another one embodiment of the present disclosure.

Referring to FIG. 1 and FIG. 2B, FIG. 2B is a schematic diagram showing the non-contact probe assembly according to another one embodiment of the present disclosure. The main difference between the first non-contact probe assemblies 100, 100' in FIG. 2A and FIG. 2B are the relative locations of the light sources 101, the astigmatism lenses 106 and the quadrant measurement devices 107.

In the embodiment of FIG. 2B, the light source 101 emits a light beam to the splitting mirror 103. The splitting mirror 103 allows the first polarized beam 1011 of the light beam to pass through the splitting mirror 1013, and reflects the second polarized beam 1012 of the light beam to change the propagation direction of the second polarized beam 1012. Thus, merely the first polarized beam 1011 of the light beam passes through the quarter wavelength plate 104.

The quarter wavelength plate 104 changes the polarized state of the first polarized beam 1011 after the first polarized beam 1011 passes though the quarter wavelength plate 104. The first polarized beam 1011 which polarized state is changed then passes through the focusing lens 105.

The focusing lens 105 makes the first polarized beam 1011 focused on the top surface 301 or a bottom surface 302 of the lens 300 under test. The first polarized beam 1011 is reflected from the lens 300 under test and then sequentially passes through the focusing lens 105, the quarter wavelength plate 104, and then is reflected by the splitting mirror 103 to change its propagation direction. Next, the reflected first polarized beam 1011 is reflected by the reflection mirror 102 to change its propagation direction, wherein after the first polarized beam 1011 passes through the quarter wavelength plate 104 again, the polarized state of the first polarized beam 1011 is changed again. The first polarized beam 1011 which is reflected by the reflection mirror 102 then passes through the astigmatism lens 106.

The astigmatism lens 106 allows the first polarized beam 1011 to pass through the astigmatism lens 106 to deliver the astigmatism beam 1015. The quadrant measurement device 107 senses the intensities of the astigmatism beam 1015 in four quadrants, so as to determine whether the first polarized beam 1011 is focused on the top surface 301 or the bottom surface 302.

The motor 401 controls the first non-contact probe assembly 100' to move the first displacement, and the second polarized beam 1012 is firstly focused on the top surface 301, such that the quadrant measurement device 107 senses the circular light spot.

The actuation assembly 400 can control the first non-contact probe assembly 100' to move the second displacement to make the second polarized beam 1012 focused on the bottom surface 302, and the optical scale 402 is used to measure the first and second displacements of the first non-contact probe assembly 100'.

The control and calculation assembly 500 can control the actuation assembly 400 to move the first non-contact probe assembly 100', calculate the radius of curvature data of the lens 300 under test according to the first displacement when the first polarized beam 1011 is focused on the top surface 301, and calculate the thickness data of the lens 300 according to the radius of curvature data, the second displacement and a plurality of parameters when the first polarized beam 1011 is focused on the bottom surface 302. The parameters can comprise the incident radial height of the first polarized beam 1011 and conic constant and the refractive index of the lens 300 under test.

Figure 3:
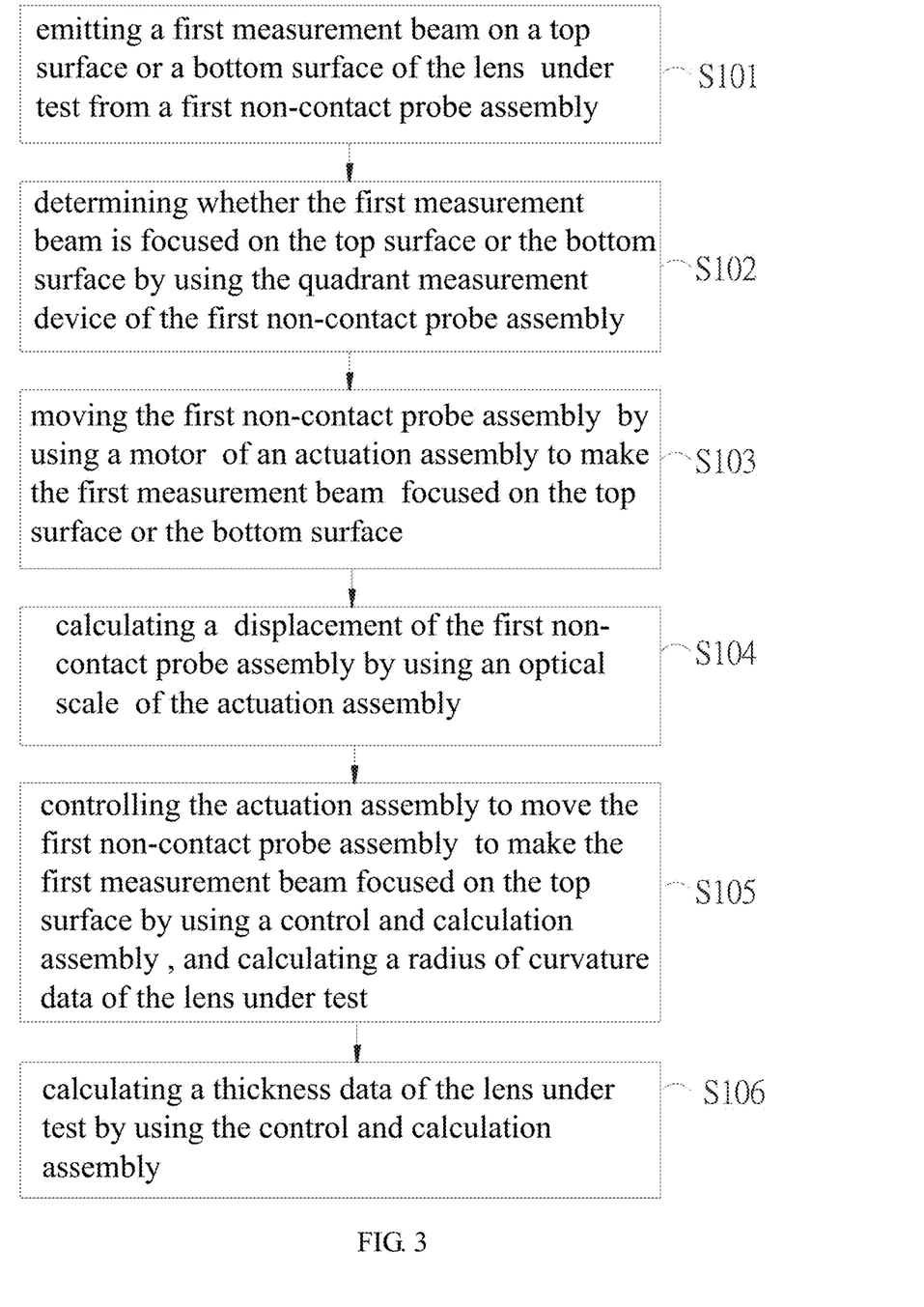
FIG. 3 a flow chart showing a non-contact measurement method for a radius of curvature and a thickness of a lens according to one embodiment of the present disclosure.
Figure 4:
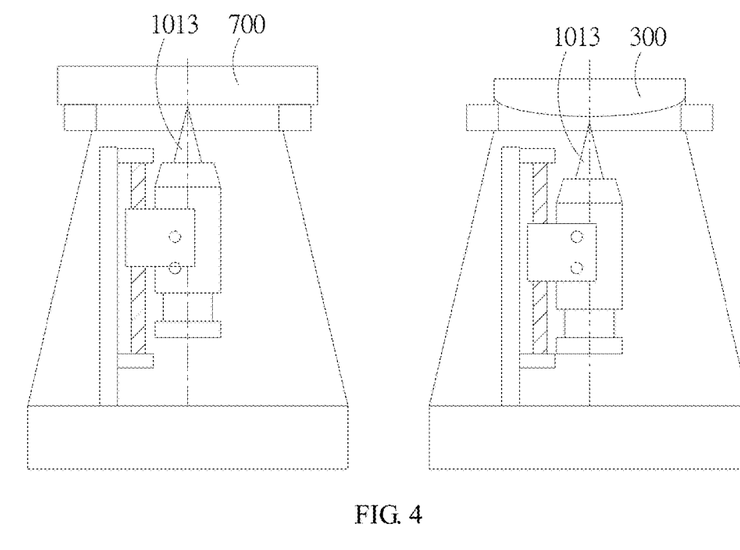
FIG. 4 is a schematic diagram showing the single non-contact probe assembly which uses the calibration plate according to one embodiment of the present disclosure.
Figure 5:
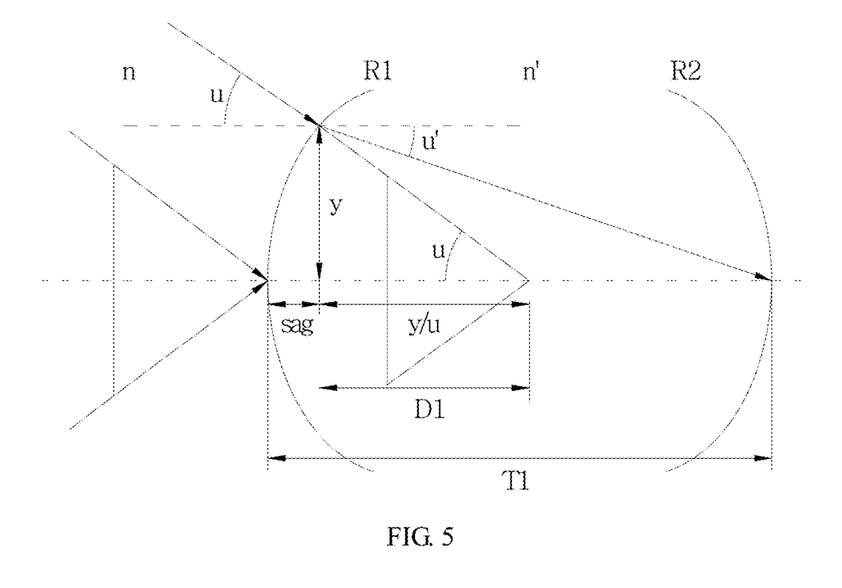
FIG. 5 is a schematic diagram showing the calculation of an estimated displacement according to one embodiment of the present disclosure.
Figure 6:
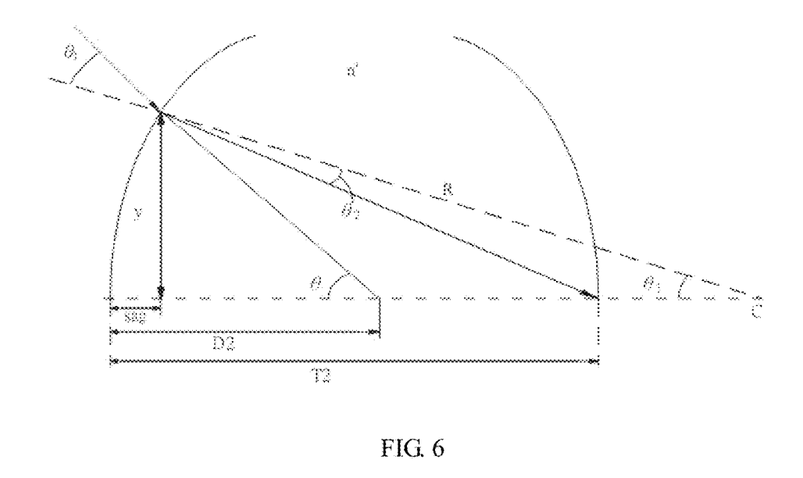
FIG. 6 is a schematic diagram showing the calculation of a thickness according to one embodiment of the present disclosure.

Referring to FIG. 3 through FIG. 6, FIG. 3 a flow chart showing a non-contact measurement method for a radius of curvature and a thickness of a lens according to one embodiment of the present disclosure, FIG. 4 is a schematic diagram showing the single non-contact probe assembly which uses the calibration plate according to one embodiment of the present disclosure, FIG. 5 is a schematic diagram showing the calculation of an estimated displacement according to one embodiment of the present disclosure, and FIG. 6 is a schematic diagram showing the calculation of a thickness according to one embodiment of the present disclosure.

As shown in FIG. 3, the non-contact measurement method for the radius of curvature and the thickness of the lens under test comprises the following steps:

S101: emitting the first measurement beam 1013 on the top surface 301 or the bottom surface 302 of the lens 300 under test from the first non-contact probe assembly 100;

S102: determining whether the first measurement beam 1013 is focused on the op surface 301 or the bottom surface 302 by using the quadrant measurement device 107 of the first non-contact probe assembly 100;

S103: moving the first non-contact probe assembly 100 by using the motor 401 of the actuation assembly 400 to make the first measurement beam 1013 focused on the top surface 301 or the bottom surface 302;

S104: calculating the first displacement of the first non-contact probe assembly 100 by using the optical scale 402 of the actuation assembly 400;

S105: controlling the actuation assembly 400 to move the first non-contact probe assembly 100 the first displacement to make the first measurement beam 1013 focused on the top surface 301 by using the control and calculation assembly 500, and calculating the radius of curvature data of the lens under test according to the first displacement; and S106: controlling the actuation assembly 400 to move the first non-contact probe assembly 100 the second displacement to make the first measurement beam 1013 focused on the bottom surface 302 by using the control and calculation assembly 500, and calculating the thickness data of the lens under test according to the second displacement and the radius of curvature data.

In one embodiment, to make the detected radius of curvature precise, a calibration plate 700 shown in FIG. 4 is measured to obtain a reference baseline for detecting the lens 300 under test. In practice, the calibration plate 700 is disposed on the lens bearing ring 600, and the first measurement beam 1013 from the first non-contact probe assembly 100 is focused on the bottom surface of the calibration plate 700 to make the focus error signal (FES) be 0. Next, the calibration plate 700 is replaced by the lens 300 under test, the first measurement beam 1013 from the first non-contact probe assembly 100 is focused on the bottom surface vertex of the lens 300 under test to make the focus error signal (FES) be 0, and the measurement is then performed.

In one embodiment, the radius of curvature data is obtained from the following equation:

$$R = \frac{(D/2) + S^2}{2S} \pm d/2.$$

R is the radius of radius of curvature; D is the diameter of the lens bearing ring 600; S is the sag or height; d is the diameter of the three ring balls on the lens bearing ring 600; and the positive sign and negative sign respectively represent the concave measurement and the convex measurement.

After obtaining the radius of curvature data by the radius of curvature calculation, the single non-contact probe assembly as shown in FIG. 5 is used to calculate the estimated displacement of the first non-contact probe assembly 100. To make the detected thickness precise, the calculation considers the displacement of the first non-contact probe assembly 100 from the location which the first measurement beam 1013 is focused on the top surface 301 to the location which the first measurement beam 1013 is focused on the bottom surface 302. Since the first measurement beam 1013 refracts when passing through the lens 300 under test, the displacement of the first non-contact probe assembly 100 is not the same as the actual thickness of the lens 300 under test when the first measurement beam 1013 is focused on the bottom surface 302, and the a calculation should be firstly done according to the following equation:

$$D_1 = sag + y/u = \frac{cy^2}{1 + \sqrt{1 - (1+k)c^2 y^2}} + \frac{nn'T_1}{n'(n' - \varphi T_1)}.$$

$D_1$ is the estimated displacement of the first non-contact probe assembly 100; sag is the sag or height; c is the reciprocal of the radius of curvature; y is the incident radial height of the first measurement beam 1013; k is the conic constant (k=0 when the lens is the spherical lens); n is the refractive index of the air (n=1); n' is the refractive index of the lens (corresponding to the wavelength of the light source, for example 637 nm in the embodiment); $T_1$ the design thickness of the lens; and φ is the reciprocal of the focusing distance corresponding the surface R1 in FIG. 3.

After the estimated displacement D1 is obtained by using the above equation, the first non-contact probe assembly 100 is controlled to move as shown in FIG. 6, so as to reduce the time which the first non-contact probe assembly 100 moves from the point which the first measurement beam 1013 is focused on the top surface 301 to the point which the first measurement beam 1013 is focused on the bottom surface 302, and accompanying with FIG. 6, the actual second displacement and the actual thickness of the lens can be calculated according to the following equations:

$$D_2 = y/\tan\theta + sag = y/\tan\theta + \frac{cy^2}{1+\sqrt{1-(1+k)c^2y^2}};$$

$$T_2 = \frac{\cos(\theta_2+\theta-\theta_1)\times y}{\sin(\theta_2+\theta-\theta_1)} + \frac{cy^2}{1+\sqrt{1-(1+k)c^2y^2}}.$$

$D_2$ is the actual second displacement of the first non-contact probe assembly 100; y is the incident radial height of the first measurement beam 1013; sag is the sag or height; θ is the extended incident angle of the edge beam 1017 of the first measurement beam 1013; $\theta_1$ is the incident angle of the first measurement beam 1013 (deviated from the normal line of the surface R1); $\theta_2$ is the refractive angle of the first measurement beam 1013 (deviated from the normal line of the surface R1); c is the reciprocal of the radius of curvature; and k is the conic constant (k=0 when the lens is the spherical lens). Finally, the actual thickness $T_2$ of the lens can be calculated.

Figure 7:
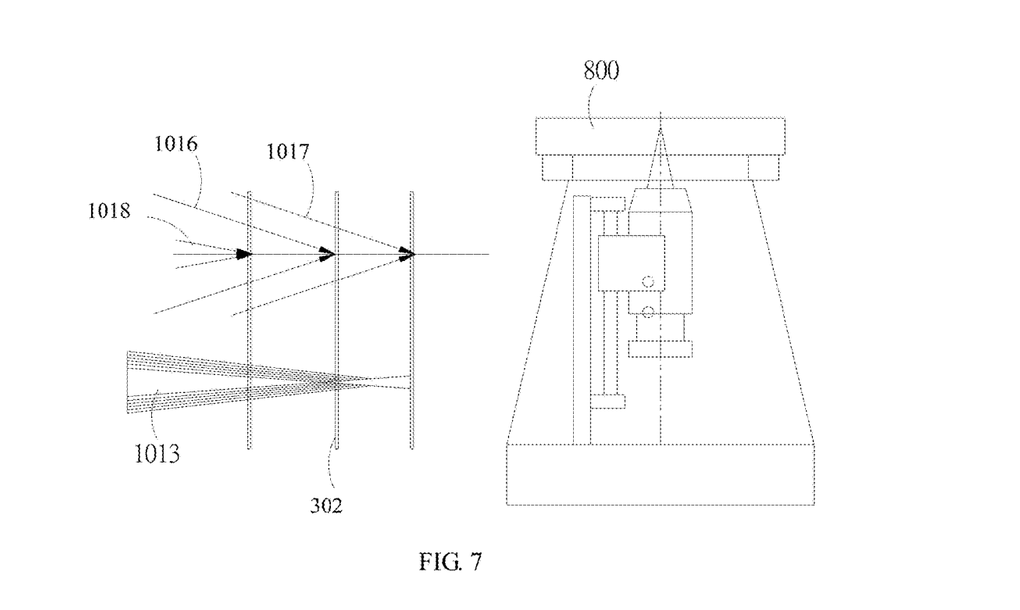
FIG. 7 is a schematic diagram showing the single non-contact probe assembly which uses the correction plate according to one embodiment of the present disclosure.

Now referring to FIG. 7, FIG. 7 is a schematic diagram showing the single non-contact probe assembly which uses the correction plate according to one embodiment of the present disclosure. In the embodiment, before detecting the lens 300 under test, a correction plate 800 disposed, and the present disclosure makes the first measurement beam focused on a bottom surface of the correction plate. Since the first measurement beam 1013 passes through the lens under test 300, for example the spherical lens, the spherical aberration is generated at the focusing point of the bottom surface 302 (the location on the surface R2 in FIG. 5). Thus, when performing the thickness conversion, the light beam corresponding to the correct thickness should be selected to be tracked, the correction beam 1016 is formed between the edge beam 1017 and the Gaussian beam 1018, and the correction plate 800 can be used to obtain the correction parameter θ, so as to make the calculation precise and reduce the calculation error.

Figure 8:
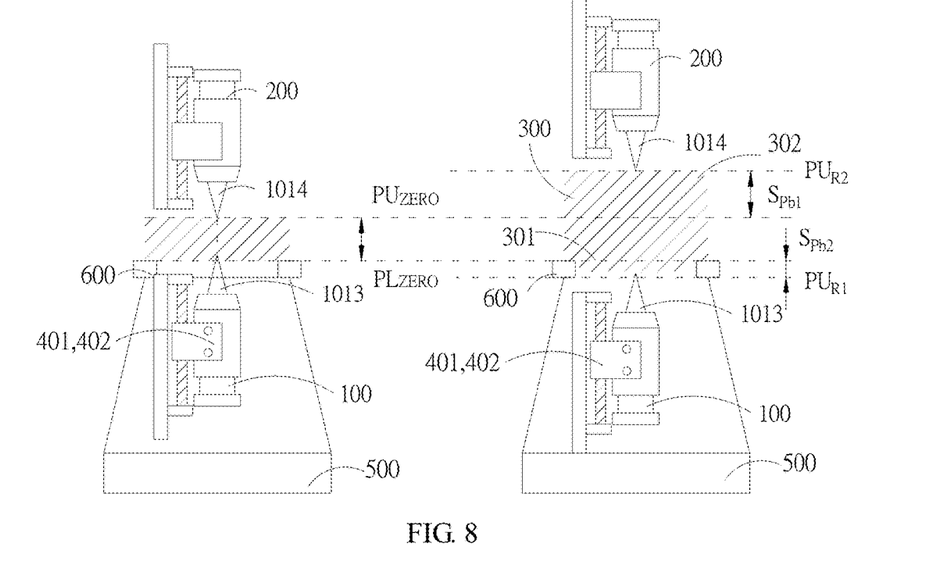
FIG. 8 is a schematic diagram showing the usage of the dual non-contact probe assemblies according to one embodiment of the present disclosure.
Figure 9:
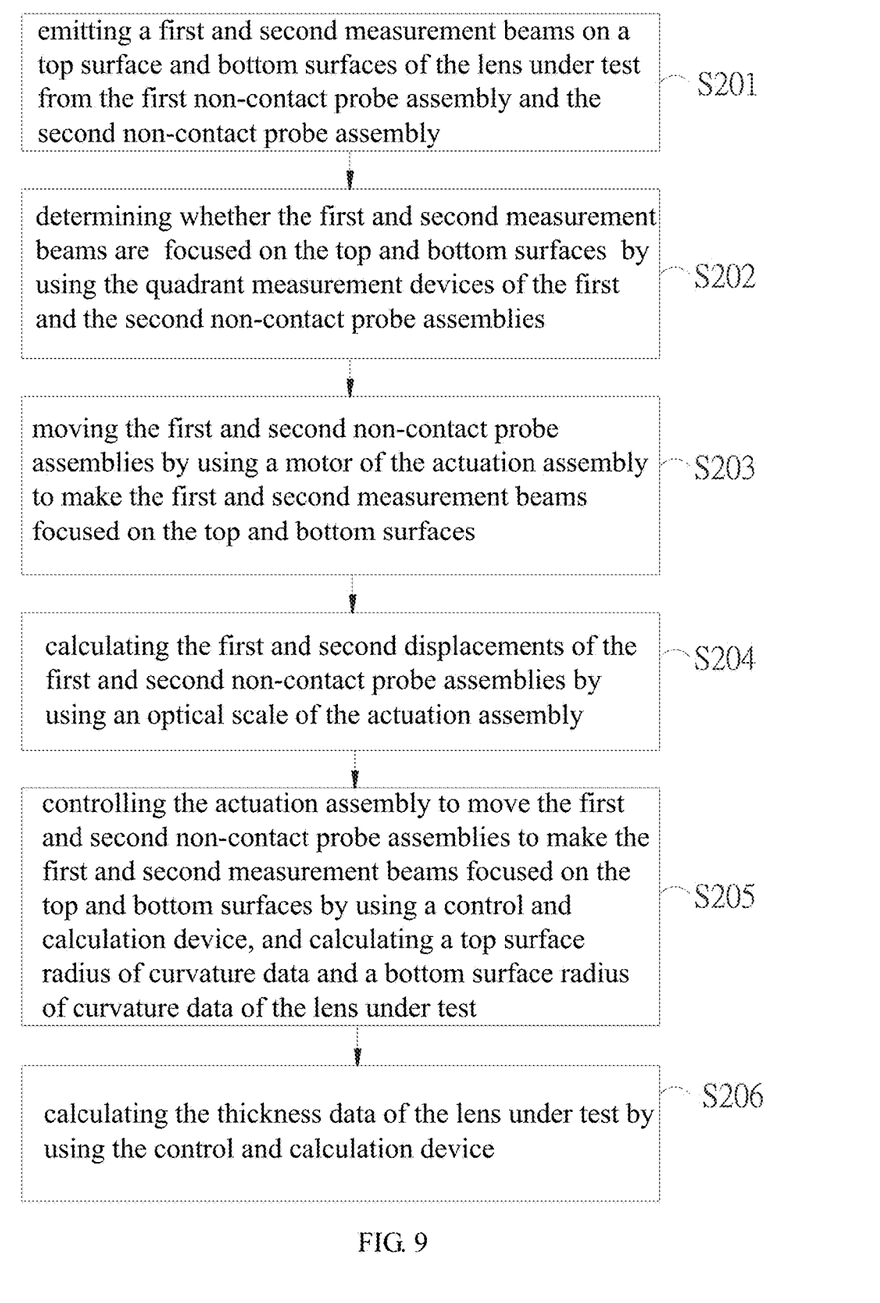
FIG. 9 is flow chart showing a non-contact measurement method for a radius of curvature and a thickness of a lens using dual non-contact probe assemblies according to one embodiment of the present disclosure.

Referring to FIG. 2, FIG. 8, and FIG. 9, FIG. 8 is a schematic diagram showing the usage of the dual non-contact probe assemblies according to one embodiment of the present disclosure, and FIG. 9 is flow chart showing a non-contact measurement method for a radius of curvature and a thickness of a lens using dual non-contact probe assemblies according to one embodiment of the present disclosure.

In the embodiment, the present disclosure not only uses single non-contact probe assembly to measure, but also uses dual non-contact probe assemblies to detect. The non-contact measurement device for the radius of curvature of the thickness of the lens under test using dual non-contact probe assemblies comprises a first non-contact probe assembly 100, a second non-contact probe assembly 200, an actuation assembly 400, a control and calculation assembly 500 and a lens bearing ring 600.

In the embodiment, the first non-contact probe assembly 100 and the second non-contact probe assembly 200 are respectively disposed above and underneath the lens under test 300. The first non-contact probe assembly 100 and the second non-contact probe assembly 200 as shown in FIG. 2A (or FIG. 2B), each comprises a light source 101, a reflection mirror 102, a splitting mirror 103, a quarter wavelength plate 104, a focusing lens 105, an astigmatism lens 106 and a quadrant measurement device 107.

In the embodiment, since the second non-contact probe assembly 200 has the same implementation as that of the first non-contact probe assembly 100, the redundant descriptions are omitted. The actuation assembly 400 also has the motor 401 and the optical scale 402. The motor 401 can control the first non-contact probe assembly 100 and the second non-contact probe assembly 200 to respectively move the first displacement and the second displacement, such that the second polarized beams 1012 (taking the implementation of FIG. 2A as the example) are respectively focused on the top surface 301 and bottom surface 302 of the lens under test 300. The optical scale 402 can measure the first displacement of the first non-contact probe assembly 100 and the second displacement of the second non-contact probe assembly 200.

The control and calculation assembly 500 can control the actuation assembly 400 to move the first non-contact probe assembly 100 and the second non-contact probe assembly 200, calculate the radius of curvature data of the top surface 301 (i.e. top surface radius of curvature data) and the radius of curvature data of the bottom surface 302 (i.e. bottom surface radius of curvature data) of the lens 300 under test according to the first displacement of the first non-contact probe assembly 100 and the second displacement of the second non-contact probe assembly 200, and calculate the thickness data of the lens 300 under test according to the radius of curvature data of the top surface 301 and the radius of curvature data of the bottom surface 302.

The lens bearing ring 600 can be disposed between the first non-contact probe assembly 100 and the second non-contact probe assembly 200 to receive the lens 300 under test. In the configuration, the first non-contact probe assembly 100 and the second non-contact probe assembly 200 can detects the top surface 301 and the bottom surface 302 of the lens 300 under test at the same time.

In practice, as shown in FIG. 9, the non-contact measurement method for the radius of curvature and the thickness of the lens using dual non-contact probe assemblies comprises the following steps:

S201: emitting a first and second measurement beams on the top surface 301 and the bottom surfaces 302 of the lens 300 under test from the first non-contact probe assembly 100 and the second non-contact probe assembly 200;

S202: determining whether the first and second measurement beams 1013, 1014 are respectively focused on the top and bottom surfaces 301, 302 by using the quadrant measurement devices 107 of the first and the second non-contact probe assemblies 100, 200;

S203: moving the first and second non-contact probe assemblies 100, 200 by using the motor 401 of the actuation assembly 400 to make the first and second measurement beams 1013, 1014 respectively focused on the top and bottom surfaces 301, 302;

S204: calculating the first and second displacements of the first and second non-contact probe assemblies 100, 200 by using the optical scale 402 of the actuation assembly 400;

S205: controlling the actuation assembly 400 to move the first and second non-contact probe assemblies 100, 200 to make the first and second measurement beams 1013, 1014 focused on the top and bottom surfaces 301, 302 by using the control and calculation device 500, and calculating the top surface radius of curvature data and the bottom surface radius of curvature data of the lens 300 under test;

S206: calculating the thickness data of the lens 300 under test by using the control and calculation device according to the top surface radius of curvature data and a bottom surface radius of curvature data based upon the thickness calculation equation.

Specifically, the manner for obtaining the top surface radius of curvature data and a bottom surface radius of curvature data can be the same as the manner by using the single non-contact probe assembly, and the difference in the usage of the dual non-contact probe assemblies is that, the first non-contact probe assembly 100 and the second non-contact probe assembly 200 can detect the top surface 301 and the bottom surface 302 of the lens 300 under test, which increases the efficiency.

In one embodiment, to make the detect radius of curvature precise, the thickness data of the correction plate 700 in FIG. 8 can be measured as the reference baseline for detecting the lens under test 300. In practice, the correction plate 700 is disposed on the lens bearing ring 600, and the first and second measurement beams 1013, 1014 from the first and second non-contact probe assemblies 100, 200 are respectively focused on the top and bottom surfaces of the correction plate 700 to make the detected focus error signal (FES) be 0. Then, the correction plate 700 is replaced by the lens 300 under test, and the first and second measurement beams 1013, 1014 from the first and second non-contact probe assemblies 100, 200 are respectively focused on the top surface convex and the bottom surface convex of the lens 300 under test to make the focus error signals (FES) be 0, and next the measurement is performed.

Next, the thickness data of the lens under test can be obtained by the following equation:

$$THI = T_P + S_{PB1} + S_{PB2} + T_P + (PU_{R2} - PU_{Zero}) + (PL_{R1} - PL_{Zero}).$$

THI is the thickness of the lens under test; $S_{PB1}$ is the sag or height of the bottom surface 302; $S_{PB2}$ is the sag or height of the top surface 301; $T_p$ is the thickness of the correction plate 700; $PU_{R2}$, $PU_{Zero}$, $PL_{R1}$, and $PL_{Zero}$ are the locations recorded by the optical scale 402. Since the thickness of the correction plate 700 is known, and $PPU_{R2}$, $PU_{Zero}$, $PL_{R1}$, and $PL_{Zero}$ can be solved by the first and second displacements, thus obtaining the thickness data of the lens under test according to the above equation.

Figure 10:
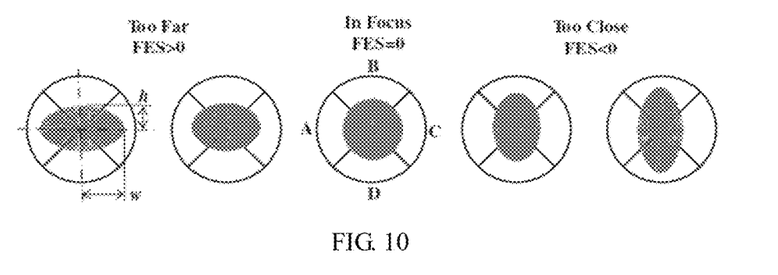
FIG. 10 is a schematic diagram showing the light spot on the quadrant measurement device according to one embodiment of the present disclosure.

The above non-contact measurement device for the radius of curvature and the thickness of the lens can be further applied to measure the defocusing amount of the object. Referring to FIG. 10 is a schematic diagram showing the light spot on the quadrant measurement device according to one embodiment of the present disclosure. The quadrant measurement device can sense the intensities QA, QB, QC, QD in the four quadrants A, B, C, and. Thus, when the object is not put on the focusing point due to micro offset (i.e. the defocusing amount), the focus error signal FES is not 0. It is noted that the focus error signal can be expressed as FES=((QA+QC)−(QB+QD))/(QA+QB+QC+QD).

Figure 11A:
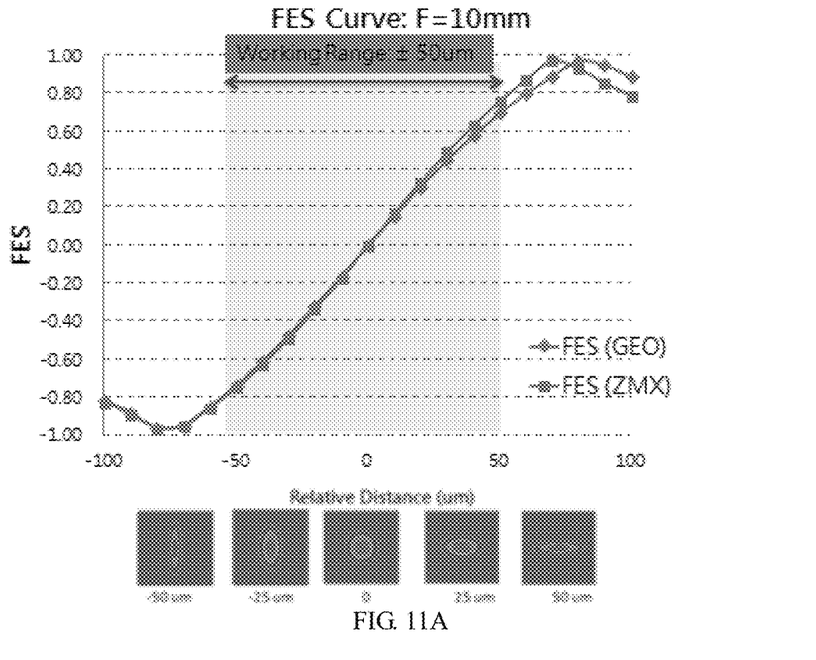
FIG. 11A is a schematic diagram showing a focus error signal while the focusing lens has a 10 mm focusing distance according to one embodiment of the present disclosure.
Figure 11B:
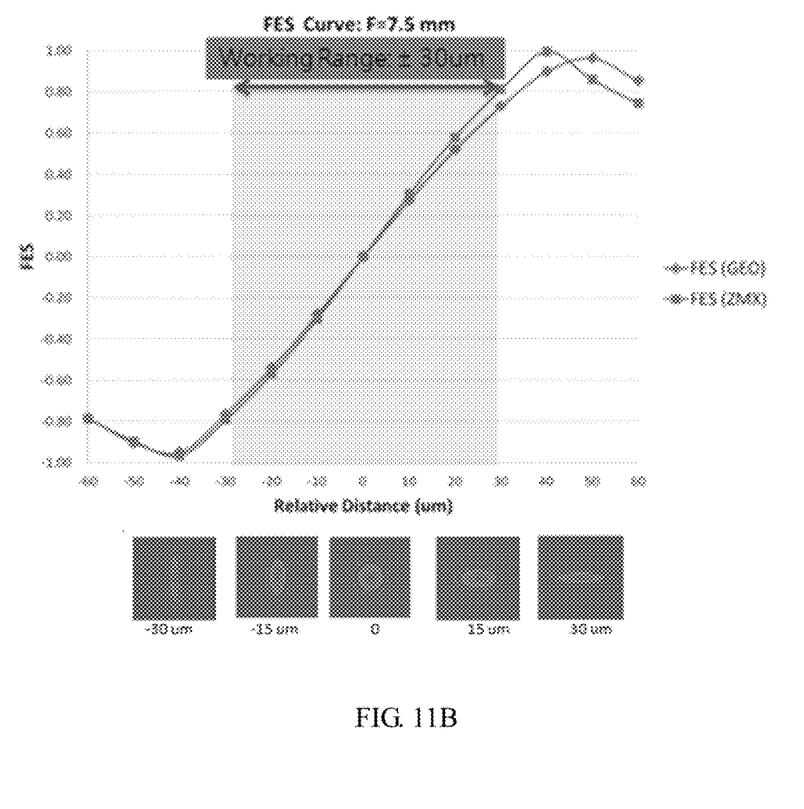
FIG. 11B is a schematic diagram showing a focus error signal while the focusing lens has a 7.5 mm focusing distance according to one embodiment of the present disclosure.

Further referring to FIG. 11A and FIG. 11B, FIG. 11A is a schematic diagram showing a focus error signal while the focusing lens has a 10 mm focusing distance according to one embodiment of the present disclosure, and FIG. 11B is a schematic diagram showing a focus error signal while the focusing lens has a 7.5 mm focusing distance according to one embodiment of the present disclosure.

As shown in the FIG. 11A and FIG. 11B, the defocusing amount (i.e. relative distance of the micro offset (unit in um, or $10^{-6}$ m)) is in response to the focus error signal. The working ranges (i.e. liner region) of the focus error signal lines (simulated by two simulation tools GEO, ZMX) in FIG. 11A and FIG. 11B have the different slopes. Therefore, it conducts that the defocusing amount is further in response to the focusing distance of the focusing lens.

Figure 12:
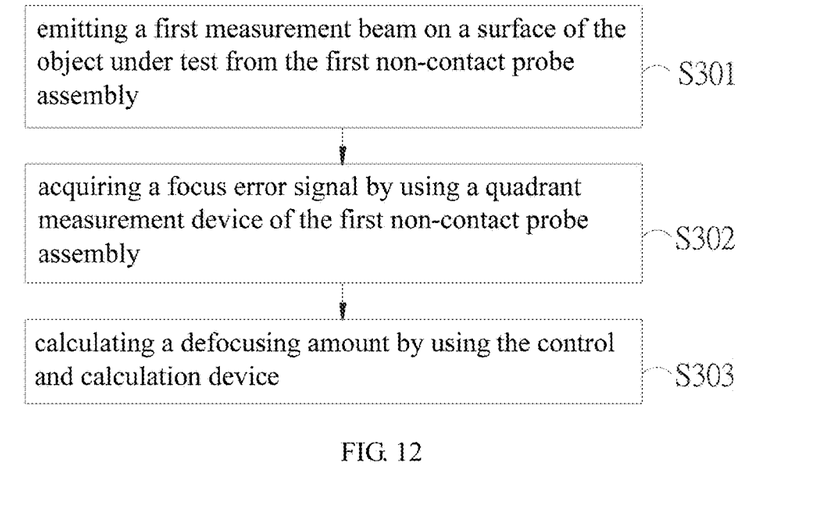
FIG. 12 is a flow chart showing a method for detecting a defocusing amount of an object under test using the non-contact measurement device for the radius of curvature and the thickness of the lens according to one embodiment of the present disclosure.

Next, referring to FIG. 12, FIG. 12 is a flow chart showing a method for detecting a defocusing amount of an object under test using the non-contact measurement device for the radius of curvature and the thickness of the lens according to one embodiment of the present disclosure. In practice, as shown in FIG. 9, the method for detecting the defocusing amount of the object under test comprises the following steps:

S301: emitting a first measurement beam on a surface of the object under test from the first non-contact probe assembly;

S302: acquiring a focus error signal by using the quadrant measurement device of the first non-contact probe assembly; and S303: calculating a defocusing amount by using the control and calculation device.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A non-contact measurement device for a radius of curvature and a thickness of a lens, comprising:
   a first non-contact probe assembly, comprising:
      a light source, emitting a light beam;
      a reflection mirror, reflecting the light beam to change a propagation direction of the light beam;
      a splitting mirror, allowing a first polarized beam of the light beam to pass through the splitting mirror, and reflecting a second polarized beam of the light beam to change a propagation direction of the second polarized beam;
      a quarter wavelength plate, changing a polarization state of the second polarized beam after the second polarized beam passes though the quarter wavelength plate;
      a focusing lens, focusing the second polarized beam on a top surface or a bottom surface of the lens under test, and the second polarized beam is reflected from the lens under test and then sequentially passes through the focusing lens, the quarter wavelength plate and the splitting mirror, wherein after the second polarized beam passes through the quarter wavelength plate again, the polarized state of the second polarized beam is changed again, and then the second polarized beam passes through the splitting mirror;
      an astigmatism lens, allowing the second polarized beam to pass through the astigmatism lens to deliver an astigmatism beam;
      a quadrant measurement device, sensing intensities of the astigmatism beam in four quadrants, so as to determine whether the second polarized beam is focused on the top surface or the bottom surface;
   an actuation assembly, including a motor and an optical scale, the motor is used to control the first non-contact probe assembly to move a first displacement to make the second polarized beam focused on the top surface firstly, and then control the first non-contact probe assembly move a second displacement to make the second polarized beam focused on the bottom surface, and the optical scale is used to measure the first displacement and the second displacement of the first non-contact probe assembly; and a control and calculation assembly, controlling the actuation assembly to move the first non-contact probe assembly, calculating a radius of curvature data of the lens under test according to the first displacement when the second polarized beam is focused on the top surface, and further calculating a thickness data of the lens under test according to the radius of curvature data, the second displacement and a plurality of parameters when the second polarized beam is focused on the bottom surface;

wherein the control and calculation assembly calculates a sag or height data according to the first displacement, and then calculates the radius of curvature data according to the sag or height data.

2. The non-contact measurement device for the radius of curvature and the thickness of the lens according to claim 1, wherein the parameters comprise an incident radial height of the second polarized beam and a cone parameter and a refractive index of the lens under test.

3. The non-contact measurement device for the radius of curvature and the thickness of the lens according to claim 1, further comprising a lens bearing ring disposed on an emission place of the first non-contact probe assembly to receive the lens under test.

4. A method for detecting a defocusing amount of an object under test using the non-contact measurement device for the radius of curvature and the thickness of the lens according to claim 1, comprising:

emitting the second polarized beam on a surface of the object under test from the non-contact measurement device;

acquiring a focus error signal by using the quadrant measurement device; and calculating the defocusing amount by using the control and calculation device according to the focus error signal and a focusing distance of the focusing lens.

5. A non-contact measurement device for a radius of curvature and a thickness of a lens, comprising:

a first non-contact probe assembly and a second non-contact probe assembly, respectively disposed above and underneath the lens under test, each of them comprises:

a light source, emitting a light beam;

a reflection mirror, reflecting the light beam to change a propagation direction of the light beam;

a splitting mirror, allowing a first polarized beam of the light beam to pass through the splitting mirror, and reflecting a second polarized beam of the light beam to change a propagation direction of the second polarized beam;

a quarter wavelength plate, changing a polarized state of the second polarized beam after the second polarized beam passes though the quarter wavelength plate;

a focusing lens, focusing the second polarized beam on a top surface or a bottom surface of the lens under test, and the second polarized beam is reflected from the lens under test and then sequentially passes through the focusing lens, the quarter wavelength plate and the splitting mirror, wherein after the second polarized beam passes through the quarter wavelength plate again, the polarized state of the second polarized beam is changed again, and then the second polarized beam passes through the splitting mirror;

an astigmatism lens, allowing the second polarized beam to pass through the astigmatism lens to deliver an astigmatism beam; and a quadrant measurement device, sensing intensities of the astigmatism beam in four quadrants, so as to determine whether the second polarized beam is focused on the top surface or the bottom surface;

an actuation assembly, including a motor and an optical scale, the motor is used to control the first non-contact probe assembly to move a first displacement and the second non-contact probe assembly to move a second displacement, so as to make the second polarized beams focused on the top surface and the bottom surface of the lens under test, and the optical scale is used to measure the first displacement of the first non-contact probe assembly and the second displacement of the second non-contact probe assembly;

a control and calculation assembly, controlling the actuation assembly to move the first non-contact probe assembly and the second non-contact probe assembly, calculating a top surface radius of curvature data and a bottom surface radius of curvature data of the lens under test according to the first displacement of the first non-contact probe assembly and the second displacement of the second non-contact probe assembly, and further calculating a thickness data of the lens under test according to the top surface radius of curvature data and the bottom surface radius of curvature data; and a lens bearing ring, disposed between the first non-contact probe assembly and the second non-contact probe assembly to receive the lens under test;

wherein the control and calculation assembly calculates a sag or height data according to the first displacement, and then calculates the radius of curvature data according to the sag or height data.

6. A non-contact measurement method for a radius of curvature and a thickness of a lens, comprising:

emitting a first measurement beam on a top surface or a bottom surface of the lens under test from a first non-contact probe assembly;

determining whether first measurement beam is focused on the top surface or the bottom surface by using a quadrant measurement device of the first non-contact probe assembly;

moving the first non-contact probe assembly by using a motor of an actuation assembly to make the first measurement beam focused on the top surface or the bottom surface;

calculating a first displacement of the first non-contact probe assembly by using an optical scale of the actuation assembly;

controlling the actuation assembly to move the first non-contact probe assembly the first displacement to make the first measurement beam focused on the top surface by using a control and calculation assembly, and calculating a radius of curvature data of the lens under test according to the first displacement; and controlling the actuation assembly to move the first non-contact probe assembly a second displacement to make the first measurement beam focused on the bottom surface by using the control and calculation assembly, and calculating a thickness data of the lens under test according to the second displacement and the radius of curvature data;

wherein the control and calculation assembly calculates a sag or height data according to the first displacement, and then calculates the radius of curvature data according to the sag or height data.

7. The non-contact measurement method for the radius of curvature and the thickness of the lens according to claim 6, further comprising measuring a calibration plate to obtain a reference baseline for detecting the lens under test.

8. The non-contact measurement method for the radius of curvature and the thickness of the lens according to claim 6, further comprising disposing a correction plate before detecting the lens under test, and making the first measurement beam focused on a bottom surface of the correction plate.

9. The non-contact measurement method for the radius of curvature and the thickness of the lens according to claim 6, further comprising disposing a second non-contact probe assembly to emit a second measurement beam, wherein the first measurement beam is illuminated on the top surface while the second measurement beam is illuminated on the bottom surface; determining whether the second measurement beam is focused on the bottom surface by using a quadrant measurement device of the second non-contact probe assembly; and controlling the second non-contact probe assembly to move a third displacement by using the control and calculation assembly.

10. The non-contact measurement method for the radius of curvature and the thickness of the lens according to claim 9, further comprising calculating a bottom surface radius data of the lens under test according to the second displacement by using the control and calculation assembly, and calculating the thickness data of the lens under test according to the radius data and the bottom surface radius data.

11. A non-contact measurement device for a radius of curvature and a thickness of a lens, comprising:
a first non-contact probe assembly, comprising:
a light source, emitting a light beam;
a splitting mirror, allowing a first polarized beam of the light beam to pass through the splitting mirror, and reflecting a second polarized beam of the light beam to change a propagation direction of the second polarized beam;
a quarter wavelength plate, changing a polarized state of the first polarized beam after the first polarized beam passes though the quarter wavelength plate;
a reflection mirror;
a focusing lens, focusing the first polarized beam on a top surface or a bottom surface of the lens under test, the first polarized beam is reflected from the lens under test and then sequentially passes through the focusing lens, the quarter wavelength plate, and then is reflected by the splitting mirror to change its propagation direction, and then the first polarized beam is reflected by the reflection mirror to change its propagation direction, wherein after the first polarized beam passes through the quarter wavelength plate again, the polarized state of the first polarized beam is changed again;
an astigmatism lens, allowing the first polarized beam to pass through the astigmatism lens to deliver an astigmatism beam; and
a quadrant measurement device, sensing intensities of the astigmatism beam in four quadrants, so as to determine whether the first polarized beam is focused on the top surface or the bottom surface;
an actuation assembly, including a motor and an optical scale, the motor is used to control the first non-contact probe assembly to move a first displacement to make the first polarized beam focused on the top surface firstly, and then control the first non-contact probe assembly move a second displacement to make the first polarized beam focused on the bottom surface, and the optical scale is used to measure the first displacement and the second displacement of the first non-contact probe assembly; and
a control and calculation assembly, controlling the actuation assembly to move the first non-contact probe assembly, calculating a radius of curvature data of the lens under test according to the first displacement when the first polarized beam is focused on the top surface, and further calculating a thickness data of the lens under test according to the radius of curvature data, the second displacement and a plurality of parameters when the first polarized beam is focused on the bottom surface;
wherein the control and calculation assembly calculates a sag or height data according to the first displacement, and then calculates the radius of curvature data according to the sag or height data.

12. The non-contact measurement device for the radius of curvature and the thickness of the lens according to claim 11, wherein the parameters comprise an incident radial height of the first polarized beam and a cone parameter and a refractive index of the lens under test.

13. The non-contact measurement device for the radius of curvature and the thickness of the lens according to claim 11, further comprising a lens bearing ring disposed on an emission place of the first non-contact probe assembly to receive the lens under test.

14. A method for detecting a defocusing amount of an object under test using the non-contact measurement device for a radius of curvature and a thickness of a lens according to claim 11, comprising:
emitting the first polarized beam on a surface of the object under test from the non-contact measurement device;
acquiring a focus error signal by using the quadrant measurement device; and
calculating the defocusing amount by using the control and calculation device according to the focus error signal and a focusing distance of the focusing lens.

* * * * *